United States Patent
Kozaki et al.

[11] Patent Number: 5,099,475
[45] Date of Patent: Mar. 24, 1992

[54] SWITCHING SYSTEM

[75] Inventors: Takahiko Kozaki, Koganei, Japan; Noboru Endo, Freehold, N.J.; Yoshito Sakurai, Yokohama, Japan

[73] Assignee: Hitachi, Ltd., Tokyo, Japan

[21] Appl. No.: 564,617

[22] Filed: Aug. 9, 1990

[30] Foreign Application Priority Data

Sep. 14, 1989 [JP] Japan .................. 1-237051

[51] Int. Cl.$^5$ ............... H04Q 11/04; H04L 12/56
[52] U.S. Cl. ..................... 370/60; 370/94.1
[58] Field of Search ......... 370/60, 94.1, 61, 58.1, 370/91, 92, 112, 84, 60.1

[56] References Cited

U.S. PATENT DOCUMENTS

| | | | |
|---|---|---|---|
| 4,577,308 | 3/1986 | Larson et al. | 370/60 |
| 4,603,416 | 7/1986 | Servel et al. | 370/60 |
| 4,864,560 | 9/1989 | Quinquis et al. | 370/60 |
| 4,926,416 | 5/1990 | Weik | 370/60.1 |
| 4,941,141 | 7/1990 | Hayano | 370/58.1 |
| 4,947,388 | 8/1990 | Kuwahara et al. | 370/60 |
| 4,970,719 | 11/1990 | Takase et al. | 370/112 |

Primary Examiner—Douglas W. Olms
Assistant Examiner—H. Kizou
Attorney, Agent, or Firm—Antonelli, Terry, Stout & Kraus

[57] ABSTRACT

A switching system for switching communication information between "M" incoming highways and "N" outgoing highways by using fixed-length cells, each having a header section and a data section and according to information contained in the header section (where "M" and "N" are integers), comprising: a demultiplexing unit for demultiplexing each incoming highway into a plurality of first output links; a switch unit, having the first output links of the demultiplexing unit as first input links and a plurality of second output links, for switching communication information between the first input links and the second output links; and a multiplexing unit, having "N" groups of input links, each group being formed by grouping a specified number of second output links, for multiplexing the cells on the second output links of each group and outputting them through one of third output links to a corresponding outgoing highway.

15 Claims, 11 Drawing Sheets

SWITCHING SYSTEM

CROSS-REFERENCE TO RELEVANT APPLICATION

The present application is relevant to U.S. Ser. No. 96,011 filed Sept. 14, 1987 entitled "Time-division Channel Arrangement" in the name of Y. Sakurai et al.; U.S. Pat. No. 4,910,731 issued on Mar. 20, 1990 and entitled "Switching System and Method of Construction Thereof" in the name of Y. Sakurai et al.; U.S. Ser. No. 382,419 filed on July 20, 1989 and entitled "ATM Switching System" in the name of Y. Torii et al.; and U.S. Ser. No. 482,090 filed on Feb. 20, 1990 and entitled "Switching System" in the name of N. Kozaki et al.

BACKGROUND OF THE INVENTION

This invention relates to a switching system for switching information such as voice information and data to transmit by time-division multiplexing by use of fixed-length cells, each having a header for routing, and particularly to a switching system suitable for switching, in an integrated manner, information essentially suitable for line switching, such as voice information together with information such as data which occurs as a burst.

There has been a requirement for a flexible and economical switching system capable of handling, in an integrated manner, communication of various nature (including burst and real-time communication) at diverse bit rates ranging from a typical bit rate of voice on the phone (64 Kb/s), low-speed data transmission (several 100 b/s) and video signals (several Mb/s).

A promising scheme to meet this requirement is a method of switching all information uniformly by using fixed-length cells, each having a header including information for routing. One example of this is a switching system which has been proposed by the present applicant in a paper entitled "A Study on an Integrated Switching Network" for National Convention in commemoration of the 70th anniversary of the foundation of the Institute of electronics, Information and Communication Engineers of Japan, 1987, Switching Division (hereafter referred to as the literature (1)).

In the above switching system, all information is transferred by using fixed-length blocks called cells. The switching system is arranged such that the space-division switch of the header drive type is used as a basic element in switching information, and a time switch function is provided for each incoming highway to avoid a collision in the space-division switch among a plurality of cells having the same destination. Furthermore, a memory for switching operation and a buffer memory for queuing are provided in the time switch function to permit two modes—the line switching mode which requires real time transmission like and the burst switching mode for transmitting data which occurs in burst, in which data transmission delay is allowed to some extent. In processing, the cells for line switching mode are not passed through the buffer memory and these cells are given priority for real time processing, while the cells for burst switching mode are placed in a queue in the buffer memory and processed when there is a free space in time slot.

Another example is a "TDM Switching System" disclosed in JP-A-59-135994. This publication does not clearly suggest the concept of handling two modes of communication, the line switching mode and the burst switching mode, but this switching system is provided with a function to replace the fixed-length cells according to the time base by use of the buffer memory. When the cells are replaced, the same buffer memory is used for queuing and switching of the cells. In order to achieve queuing, a queue unit is provided in which the addresses of the buffer memory to write the cells at are stored classified by the destinations of the cells.

In switching operations by use of the fixed-length cells, since the destinations of the cells are not distributed evenly, it can happen that the cells bound for the same destination are concentrated and congested for a while or the cells are lost by overflow of the memory. In the literature (1) by the present applicant mentioned earlier, a buffer memory is provided for the outgoing highway for each destination to avoid the congestion of the cells. Each of the buffer memories need to have capacity for storing all cells that do not overflow the memory capacity. A buffer memory needs to be provided for each destination. This arrangement has a problem of requiring a large number of memory devices.

On the other hand, in the switching system mentioned in the second place (JP-A-59-135994), only one buffer memory is provided for all inputs, and a plurality of queuing means which store only the addresses of the buffer memory are provided for the respective destinations. In this arrangement, the clustering of the cells for certain destinations can be handled by the relatively small memory capacity. However, the write addresses in the buffer memory are used periodically, so that logically, this arrangement is equivalent to having a buffer memory divided fixedly into the memory regions corresponding to the respective destinations. And, when the cells in a queue exceed a certain number, even if there remain cells yet to be read out, it happens that data in the buffer memory is overwritten. If this occurs, the cells on which new cells are written are lost. This is another problem.

In order to solve the above problems, the present applicant proposes in U.S. Pat. No. 4,910,731 corresponding to JP-A-63-102512 that in a switching system for switching operation by multiplexing incoming highways in time division, writing the cells that have arrived into the buffer memory, reading the cells in a proper sequence, demultiplexing and distributing the cells into a plurality of outgoing highways, the switching system comprises an FIFO (First In First Out) buffer for storing empty addresses of the buffer memory (called the empty address FIFO), and means for controlling the addresses currently used for the respective outgoing highways, and a so-called empty address chain whereby in writing a cell into the buffer memory, an empty address is taken from the data output of the above-mentioned empty address FIFO, and in reading a cell from the buffer memory, the address at which the cell has been read is returned to the input of the above-mentioned empty address FIFO.

According to the switching system arranged as described, as cells arrive and are written into the buffer memory, empty addresses are obtained from the one empty address FIFO regardless of the destinations or outgoing highways of the cells, so that the cells can be written in any region of the buffer memory so long as there is an empty space in the buffer memory. Even if there is irregularity in the distribution of the destinations of the cells that arrive, that is, even if the cells are clustered for certain outgoing highways, there should be corresponding decreases in the cells bound for the destinations other than the above-mentioned destinations for which the cells are clustered. Therefore, the total capacity of the buffer memory that is required is unchanged.

Another advantage is that until a cell is read out, the address at which the cell is stored is not returned to the empty address FIFO, so that it never happens that a newly-arrived cell is overwritten on the same address and the cell that has existed there is lost.

SUMMARY OF THE INVENTION

In broadband switching systems for switching by use of fixed-length cells, there are two cases in terms of bit rate (link speed): one case where the bit rate of cells on the incoming or outgoing highways (link) is about 150 Mbps and the other case where the bit rate is 600 Mbps, four times that of the former case. If the switching system is made in an LSI circuit by CMOS technology, signals from the incoming highways into the system can be converted into 8-bit parallel signals, by which signal processing at the link speed of 150 Mbps can be realized. However, with this circuit as it is, it is difficult to realize signal processing at a four-fold link speed of 600 Mbps. To realize this feat, it is necessary to develop an LSI circuit by a different technology.

The object of this invention is to realize a switching system in the method of sharing a buffer memory among the outgoing highways, which is capable of handling a link speed of, e.g., 600 Mbps, integral multiples of the currently possible link speed by making partial circuit alterations and additions to the LSI circuit of the switching system which was developed for the currently handlable link speed of 150 Mbps.

To achieve the above object, according to an aspect of this invention, a switching system for switching communication information between "M" incoming highways and "N" outgoing highways by using fixed-length cells, each having a header section and a data section, which are input into the incoming highways, including:

a demultiplexing unit for demultiplexing each the incoming highway into a plurality of first output links;

a switch unit, having the first output links of the demultiplexing unit as first input links and a plurality of second output links, for switching communication information between the first input links and the second output links according to information contained in the header section; and a multiplexing unit, having "N" groups of second input links, each group being formed by grouping a specified number of second output links, and "N" third output links, for multiplexing the cells on the second output links of each group and connecting a cell to one corresponding outgoing highway as a third output link.

To be more specific, a switching system is constructed such that the cells on the respective incoming highways are demultiplexed to a plurality of links and supplied to the switch unit. The output links of the switch unit are divided into groups of a specified number of output links, and the cells on the output links of each the group are multiplexed and output to one outgoing highway. By this arrangement, the bit rate of the cells supplied to the switch unit can be made slower than the bit rate of the incoming highways, so that it is possible to comply with an increase in the link speed.

According to another aspect of this invention, a switching system for switching communication information between "M" incoming highways for transmitting cells at a bit rate of m×v (bps) and "N" outgoing highways for transmitting the cells at a bit rate of n×v (bps) by using fixed-length cells, each cell having a header section and a data section, which are input into the respective incoming highways and according to information contained in the header section (where "N", "M", "m", and "n" are integers, and "v" and "v'" are positive integers), including:

"M" first demultiplexing units, provided to correspond with the "M" incoming highways, each of which highways has "m" first output links, each the demultiplexing unit for, on receiving "m" cells at a bit rate of m×v (bps) from the corresponding incoming highway, demultiplexing the cells into the "m" first output links and outputting the cells on after another at a bit rate of v (bps) to each first output link;

a first switch unit, having "m"×"M" pieces of the first output links of the "M" first demultiplexing units as first input links with a bit rate of v (bps) and "n"×"N" pieces of second output links with a bit rate of v' (bps), for switching communication information between the first input links and the second output links according to information contained in the header section; and "N" first multiplexing units, provided to correspond with "N" outgoing highways and each having a third output link, each the first multiplexing unit being capable of inputting cells to "n" corresponding second output links of the first switch unit, multiplexing "n" cells supplied at a bit rate of v' (bps) on the "n" second output links, and outputting the cells at a bit rate of n×v (bps) to third output links to output the cells to the corresponding outgoing highways.

In a switching system the present applicant revealed in JP-A-63-102512, the cells on a plurality of incoming highways are multiplexed in time division, and the cells are written into the buffer memory. In an embodiment of this invention, a time-division multiplexer (a multiplexing circuit) is used, so that the cells are shifted in input timing with respect to one another and are multiplexed and output in the order of input. By this arrangement, the cells are stored in the buffer memory in the order of arrival.

The cells read from the buffer memory in adequate sequence are demultiplexed and distributed to a plurality of outgoing highways. The demultiplexer (demultiplexing circuit) operates in the manner opposite to the multiplexing circuit. In other words, when the arriving cells are distributed to a plurality of outgoing highways, the cells are output with their output timing shifted little by little with respect one another. Then, the cells can be distributed to a plurality of outgoing highways in the order of output from the buffer memory.

Using this switching system, let us consider a method of achieving an input/output link speed of, e.g., 600 Mbps by making partial circuit alterations and additions to the switching system.

In this switching system, four 150-Mbps-bit-rate input links of the buffer memory are connected with a 600 Mbps/150 Mbps converter. The cells input at 600 Mbps on one link are demultiplexed by the 600 Mbps/150 Mbps converter with the timing of the cells shifted little by little with respect to one another in the order of input into the four input links at a bit rate of 150 Mbps, and the outputs from the converter are connected to the input links of the buffer memory, which input links are matched with the input timing of the buffer memory. By this arrangement, the cells can be stored in the buffer memory in the order of input of the cells on the 600 Mbps link.

Conversely, in this switching system, if four output links of the buffer memory are connected to a 150 Mbps/600 Mbps converter, and the cells shifted little by little in input timing with respect to on another are multiplexed and output in the order of input. Then, the cells can be output to a 600 Mbps output link in the order of output from the buffer memory.

In an example of this switching system, there are provided an FIFO buffer for storing the empty addresses of the buffer memory and a unit for controlling the addresses currently used for the respective outgoing highways. This switching system is operated by the method of sharing the buffer memory among the outgoing highways in such a manner that in writing a cell in the buffer memory, an empty address is taken from data output from the empty address FIFO, and in reading a cell from the buffer memory, the address at which the cell has been read is returned to the input of the empty address FIFO. If this switching system is provided with a 150 Mbps/600 Mbps converter and a 600 Mbps/150 Mbps converter and 600 Mbps input and output links are used, it is only necessary to replace the unit for controlling the addresses currently used for the respective outgoing highways with a unit for controlling the addresses for the 600 Mbps links.

More specifically, according to an embodiment of this invention, in a switching system with a link speed of 150 Mbps, if a 600 Mbps/150 Mbps converter is added to the input link and a 150 Mbps/600 Mbps converter is added to the output link and the unit for controlling the addresses currently used for the respective outgoing highways is replaced by a unit for controlling the addresses for the 600 Mbps links, this switching system operates at a link speed of 600 Mbps. In this case, the cells need to be output while they maintain their order of input.

The above-mentioned 600 Mbps/150 Mbps converter distributes the cells into the four paths by shifting their timing while keeping their order of input. At the 150 Mbps link switches, the cells are multiplexed in time division while their shifted timing maintained and are input to the buffer memory. The cells can be stored in the buffer memory in the order of input of the cells on the 600 Mbps input links. In reading the cells from the buffer memory, they are controlled for the relevant 600 Mbps links and are read in the order of input. The cells which have been read for the relevant 600 Mbps links are demultiplexed once by the demultiplexing circuit into the 150 Mbps links. Four 150 Mbps links each are converged to a 600 Mbps outgoing highway link, through which the cells are output at 600 Mbps link speed as they are multiplexed by the 150 Mbps/600 Mbps converter. The demultiplexing circuit performs demultiplexing to the four paths. Since the cells are demultiplexed at the same timing as they were input, the cells are output to the 600 Mbps output links in the order of read-out from the buffer memory.

Thus, the cells are output through the 600 Mbps output links in their order of input.

DESCRIPTION OF THE PREFERRED EMBODIMENTS

Figure 1:
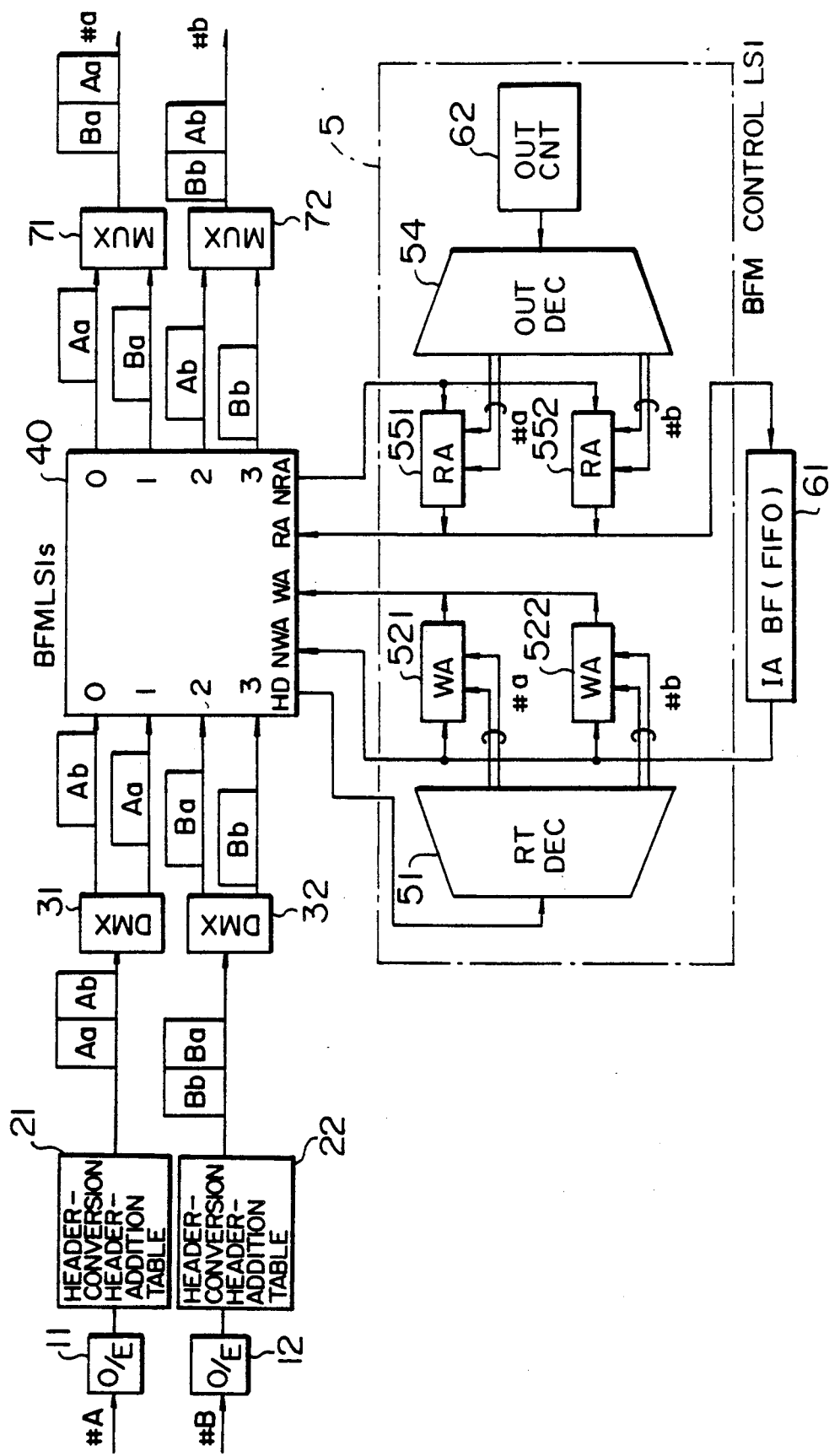
FIG. 1 is a diagram showing an embodiment of a two-input two-output switching system arranged by using a four-input four-output switch.

With reference to the accompanying drawings, the switching system according to this invention will be described. FIG. 1 is a schematic diagram showing an example of the switching system according to this invention.

FIG. 1 shows an example of a two-input two-output switching system of an input/output link speed of 300 Mbps formed by a buffer memory (BFM) LSIs 40 for a four-input four-output switch with the input/output link speed of, e.g., 150 Mbps, a BFM control LSI 5, an empty address memory 61, which is a FIFO buffer memory (IA BF (FIFO)) for example, a demultiplexer to provide the buffer memory 40 with the input link speed by converting 300 Mbps to 150 Mbps, namely, 300 Mbps/150 Mbps converters (DMX) 31, 32, multiplexers to convert a link speed signal of 150 Mbps from the buffer memory 40 to a link speed of 300 Mbps, namely, 150 Mbps/300 Mbps converters (MUX) 71, 72.

Reference numerals 11 and 12 indicate photoelectric (O/E) converters and 21 and 22 indicate header-conversion header-addition tables. These devices are of the same construction as the O/E converters 11' to 18' and the header-conversion header-addition tables 21' to 28'.

The bit rate of the input links (incoming highways) #A, #B is 300 Mbps, for example. Cells Aa, Ab of the input link #A are output to the output links (outgoing highways) #a, #b, respectively, while cells Ba, Bb of the input link #B are output to the output links #a, #b, respectively. The cells of the input links #A, #B are passed through DMXs 31, 32 and further divided into two links, for example, so that the respective bit rates become 150 Mbps. The timing of the cells divided into two links shifts a little with respect to one another. The shift in timing is arranged to occur in the order of their arrival on the input links of 300 Mbps. How the timing is shifted will be described with reference to FIG. 8. When they go through the four output links of DMXs 31, 32, the cells are shifted in timing with respect to one another and input into the input terminals 0 to 3 of the BFM LSIs 40, the cells are multiplexed in the BFM LSIs 40, and they are written one after another in the buffer memory in the BFM LSIs 40 in the order of input. The timing of reading out the cells from the buffer memory is divided into four kinds of periodic timing. According this set of timing, the cells are output through the output terminals 0 to 3 of the BFM LSIs 40. The cells are read from the buffer memory to the output link #a one after another at the timing that they are output to the output terminals 0, 1 of the BFM LSIs 40 at the bit rate of 150 Mbps in the order of output terminals 0 to 1. The cells from the output terminals 0, 1 of the BFM LSIs 40 are multiplexed in the order of arrival by the MUX 71 and output at 300 Mbps to the output link #a. The cells which go to the output link #b are subjected to the same operation as mentioned above in the BFM LSIs 40. After those cells are read from the buffer memory, they are output from the output terminals 2, 3 of the BFM LSIs 40, multiplexed by the MUX72 and output to the output link #b.

Under this construction, the cells are output in the order of input by the DMXs 31, 32 and MUXs 71, 72. Also at the BFM LSIs 40, the cells are output from the output terminals 0 and 1 in the order of input, and the cells are likewise output from the output terminals 2 and 3 in the order of input. Therefore, the cells are output at the output links #a, #b in the order of input, respectively.

The buffer memory of the BFM LSIs 40 is controlled by the BFM control LSI 5 and the empty address FIFO 61. When cells are input successively into the BFM LSIs 40, the headers of the cells are output from one after another from the output terminal HD, and decoded by the decoder (RT DEC). As a result of decoding, if the header indicates the output links a write address is output from a write address register (WA) 521 corresponding to the link #a. If the header indicates the output link #b, a write address is output from a writing address register (WA) 522 corresponding to the link #b. This write address is input to the input terminal WA of the BFM LSIs 40, and serves as the address of the buffer memory where the cell is written. At this time, from the empty address FIFO 61 where empty addresses on the buffer memory are stored, the next address (for writing a cell going to the same output link) is read, and the contents of the write address register (WA) from which a write address was output is updated by writing in the next address. Furthermore, the next address is entered into the input NWA of the BFM LSIs 40, and written in the same address where the cell has been written so as to be stored together with the cell.

A counter (OUT CNT) 62 outputs counts corresponding to the output terminal numbers of the BFM LSIs 40 one after another, and in this way, generates the numbers of the output terminals to cause the cells at the output terminals to be output at the proper read timing of the buffer memory. More specifically, the counter 62 outputs the counts 0 to 3 cyclically one after another at the proper timing. The counting timing of the counter 62 has only to be set to equal to or higher than the input timing of cells into the BFM LSIs 40. In this embodiment, both timing is the same. The output (count) from the counter 62 is decoded by the decoder (OUT DEC) 54, and if the count is the number 0 or 1 corresponding to the output link #a, a read address is output from the read address register (RA) 551. If the count is the number 2 or 3 corresponding to the output link #b, a read address is output from the read address register (RA) 552. This read address is input into the input terminal RA of the BFM LSIs 40, the cell at that address on the buffer memory is read, and output to the output terminal of the same number as the count of the counter 62. The read address output from the read address register (RA) becomes an empty address when the cell is read from that address, and this address is input into the empty address FIFO 61. When a cell is read from the buffer memory, the next address which is output together with the cell is output from the output NRA of the BFM LSIs 40, and the address is stored in the read address register (RA) from which the read address was output.

In the buffer memory, an address of a cell to be read next is stored at the same address as the cell which is read previously, that is to say, the next address is stored in the same address. Each time a cell is read from the buffer memory, the address of the cell to be read next, which is output to the same outgoing highway as the previous cell, is automatically made known. As described, for the buffer memory, address chain control is performed for the separate output links #a, #b, so that the addresses in the buffer memory can be used with both output links #a, #b. Thus, the buffer memory is arranged such that it can store cells until there is no more next address in the empty address FIFO 61 and that the buffer memory can be used commonly with both output links.

If the system of FIG. 1 is used as a two-input two-output switching system of the input/output link speed of 300 Mbps, the cells which go to the output link #a are controlled by the write address register (WA) 521 and the read address register (RA) 551. On the other hand, the cells which go to the output link #b are controlled by the write address register (WA) 522 and the read address register (RA) 552. When the system of FIG. 1 is used as a four-input four-output switching system of the input/output link speed of 150 Mbps, it is necessary to arrange the BFM control LSI such that it has four write address registers (WA) and four read address registers (RA) that respectively correspond to the output terminals 0 to 3. A four-input four-output switching system can be formed by a BFM control LSI organized as described, BFM LSIs 40, and an empty address FIFO 61. To form a two-input two-output switching system with the input/output link speed of 300 Mbps, what is required is to form a BFM control LSI of the same composition as the BFM control LSI 5 of FIG. 1 and provide DMXs 31, 32 and MUXs 71, 72 as shown in FIG. 1.

Description has been made briefly of how to modify a two-input two-output switching system with the input link speed of 300 Mbps into a four-input four-output switching system with the input/output link speed of 150 Mbps by making partial circuit alterations and additions. Referring to FIGS. 2 to 9, detailed description will now be made of how to form a two-input two-output switching system with the input link speed of 600 Mbps.

Referring to FIGS. 2 to 6, description will first be made of the conventional switchboard (asynchronous transfer mode (ATM) switching system) for broadband ISDN. A switching system of this type is disclosed in U.S. Pat. No. 4,910,731 mentioned above.

Figure 2:
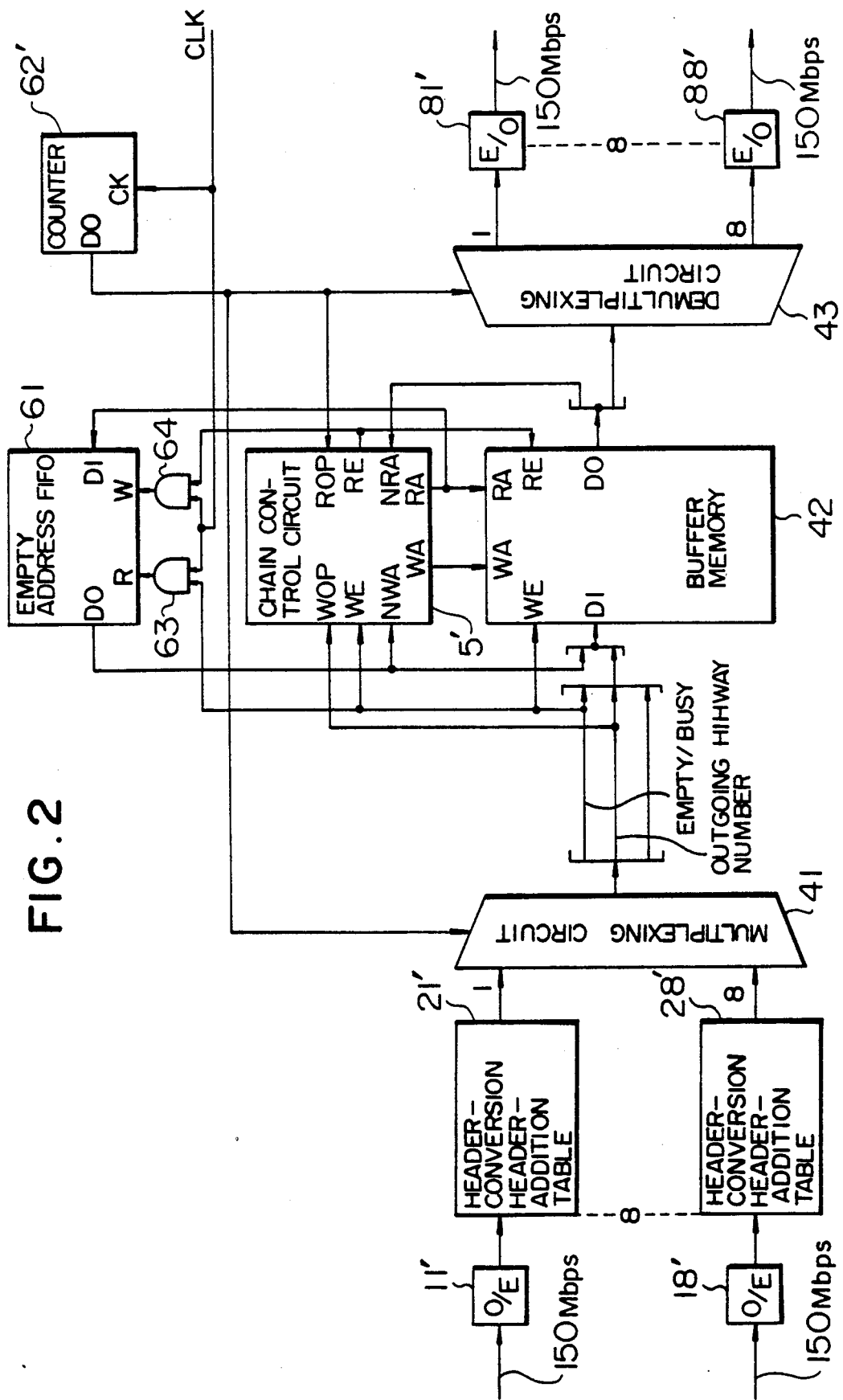
FIG. 2 is a diagram showing an example of the conventional switching system with input/output link speed of 150 Mbps.

FIG. 2 is a general block diagram of an eight-input eight-output ATM switching system. Referring to FIG. 2, O/E converters 11' to 18' convert optical signals input at 150 Mbps into electrical signals, for example, and are output to the corresponding header-conversion header-addition tables 21' to 28'.

Figure 3A:
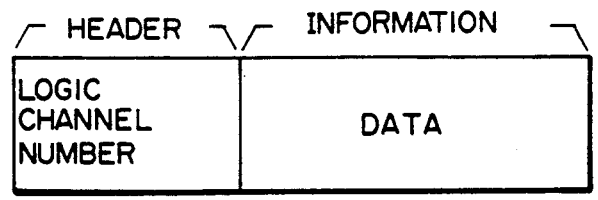
FIG. 3A shows a cell format in the input/output link in FIG. 2 or FIG. 7.
Figure 3B:
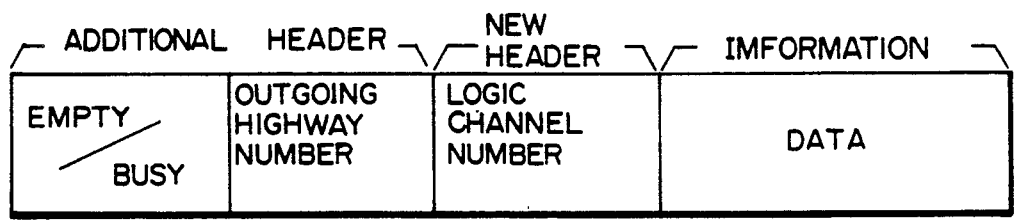
FIG. 3B shows a cell format after the cells have passed the header-conversion header-addition table.

Output data is in the form of a fixed-length packet (cell), and its format is composed of a logic channel number and data as shown in FIG. 3A. The header-conversion header-addition tables 21' to 28' convert the logic channel numbers of the cells of FIG. 3A and put additional headers at the heads of the cells and output the cells in the cell format of FIG. 3B. As for the data on empty/busy state of the cell in the additional header of FIG. 3B, when this data is "1", the cell has effective data, and when the data is "0", this indicates that the cell is empty (has no effective data). The outgoing highway number is information about the destination of the cell. In the ATM switching system of FIG. 2, the destination of output (outgoing highway number) of the cell is decided.

Figure 4:
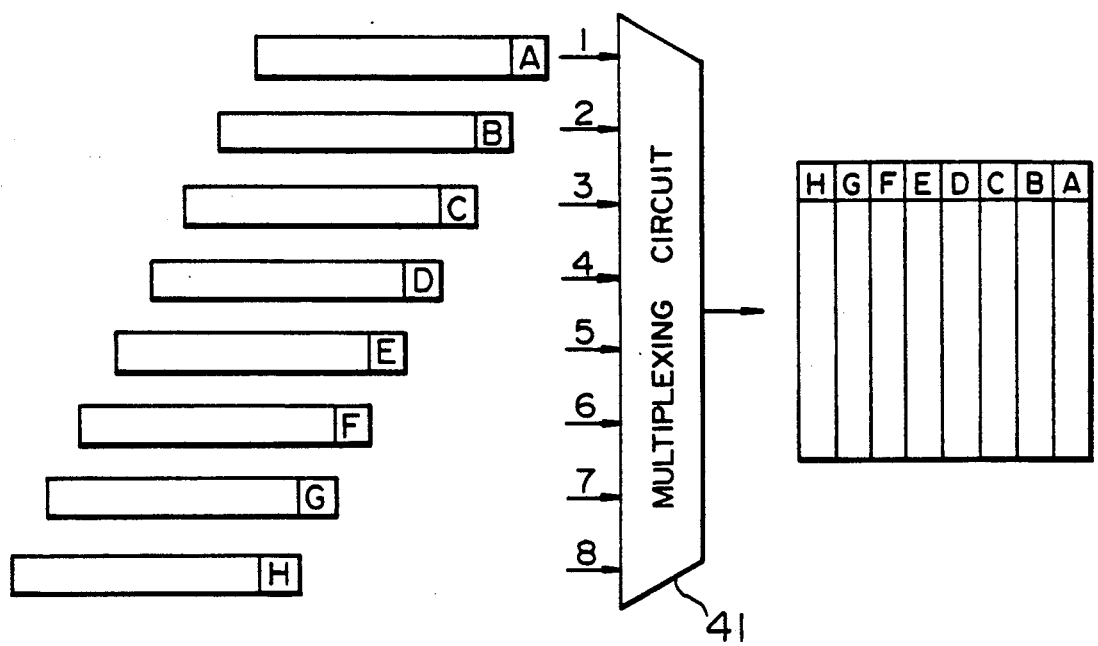
FIG. 4 is a diagram for explaining the operation of the multiplexing circuit in FIG. 2 or FIG. 7.

In the multiplexing circuit 41, the cells coming from the header-conversion header-addition tables 21' to 28' are multiplexed and output one by one. FIG. 4 shows the operation of the multiplexing circuit 41. The arriving cells are input into the multiplexing circuit 41 with their timing shifted with respect to one another, and for a period of shift of timing, one cell is output. The multiplexing circuit outputs the cells in the order of input.

The cells output from the multiplexing circuit 41 are stored one after another in the buffer memory 42. When a cell is stored, chain control circuit 5' receives the empty/busy state data and the outgoing highway number at the input terminals WE and WOP, and in response, outputs a write address from the output terminal WA. The write address has been input beforehand from the empty address FIFO 61 which stores the addresses of the buffer memory 42 where no cell is stored. Using the write address, the cell is written in the buffer memory. When the cell is empty, the input terminal WE of the buffer memory 42 becomes "0", so that the cell is not written in the buffer memory. In addition, the read clock terminal R of the empty address FIFO is made "0" by an AND gate 63, so that no empty address is output from the FIFO 61.

In reading cells from the buffer memory 42, a read address RA is provided from the chain control circuit 5 according to the count output from the terminal DO of the counter 62, and the cell is read by using this address as the read address Ra of the buffer memory 42. The output values of the counter 62' correspond to the outgoing highway numbers for the cells that are read. Thus, the cells are read one after another for each outgoing highway. The addresses used as the read addresses are sent to the data input terminal (DI) of the empty address FIFO 61, and are used again as write addresses. If there is no cell in the buffer memory 42 which has the outgoing highway number designated by the counter 62', the read enable signal (RE) from the terminal RE becomes "0", so that no cell is read from the buffer memory 42.

The data output (DO) from the terminal DO of the empty address FIFO 61 is stored together with the cell in the buffer memory 42. This is done to indicate the store address of the next cell which goes to the same outgoing highway as the current cell. The operation of the chain control circuit 5' will be described in detail later by referring to FIG. 5.

The cells read from the buffer memory 42 are distributed by the demultiplexing circuit 43 into the outgoing highways designated by the counter 62'. This operation is the opposite of the operation of the multiplexing circuit 41. The demultiplexing circuit 43 outputs the cells, which arrive one after another, to the outgoing highways corresponding to the counts of the counter 62' by shifting their timing little by little. The cells output from the demultiplexing circuit 43 are converted by the E/O converters 81' to 88' from electrical signals to optical signals, and output at 150 Mbps, for example.

Figure 5:
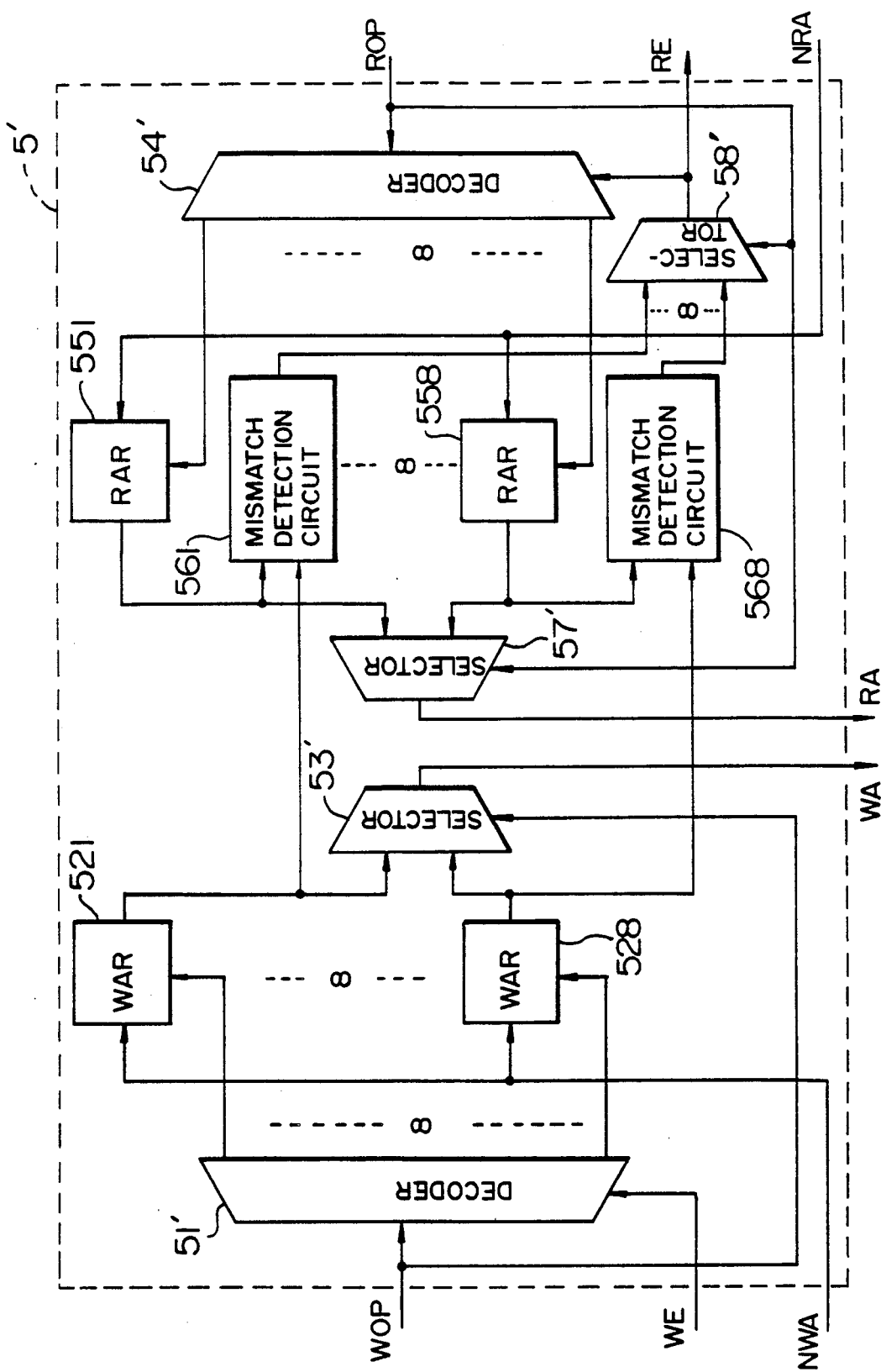
FIG. 5 is a diagram showing an example of chain control circuit in FIG. 2.

With reference to FIG. 5, the chain control circuit 5' will be next described. Write address registers WAR 521 to 528 are provided to have a one-to-one correspondence with the respective outgoing highways. A register WAR corresponding to the outgoing highway number provided through the input terminal WOP is made rewritable by output from the decoder 51'. However, if the input WE is "0", that is, if the cell is empty, no register WAR is selected by the decoder 51', and no WAR is rewritten. The write address register WAR corresponding to the outgoing highway number at the input WOP outputs its value through a selector 53' to the output terminal WA, and simultaneously, gets the next address which has been input to the input terminal NWA from the empty address FIFO.

By this operation, the next address written at the write address of the buffer memory from a certain write address register becomes coincident with the value of the write address register WAR corresponding to the outgoing highway number, so that the address chain of the outgoing highway number corresponding to this write address number WAR extends by one address.

Read address registers RAR 551 to 558 are provided to have a one-to-one correspondence with the outgoing highways. The address at a read address register RAR corresponding to the outgoing highway number input at the input ROP from the output DO of the counter 62' is made rewritable. Whereupon, the RAR outputs its value through the selector 57' to the terminal RA, and simultaneously, gets the next address which has been input at the input terminal NRA and which has been read out together with the cell from the buffer memory. By this operation, the next address present at the read address of the buffer memory is read and stored in the register RAR as the address which is to be read next through the relevant outgoing highway, so that the address chain of the outgoing highway number corresponding to this RAR contracts by one address.

The address chain will now be described with reference to FIG. 6. The addresses of the cells of a certain outgoing highway stored in the main buffer are arranged in a chain, by which buffering control is exercised over the addresses in such a manner that an address designated by a read address register RAR is a starting point, the next address written at a given address of the main buffer is the next address, and an address designated by a write address register WAR of the same outgoing highway is an ending point.

Figure 6:
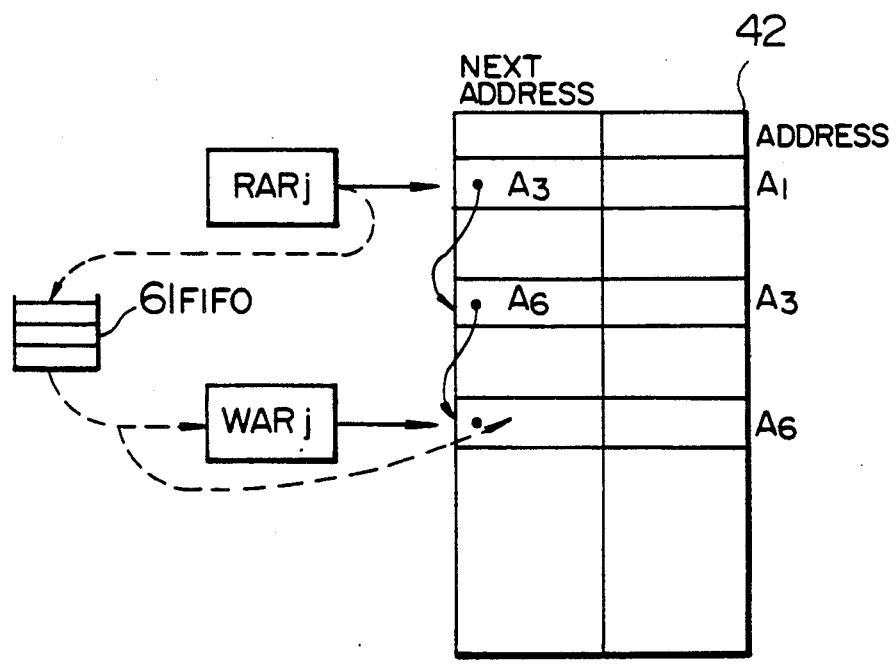
FIG. 6 is a diagram for explaining the address chain.

When, as shown in FIG. 6, addresses A1, A3, and A6 are written in a chain form in that order in a write address register WARj of a certain outgoing highway "j" with the address A1 as a starting point, addresses A1, A3, and A6 are likewise written in a chain form in that order in a read address register RARj with the address A1 as a starting point. After the address A6 is read from the WARj, if no cell arrives at this outgoing highway "j", the content of the write address register WARj is not updated, so that the content of the write address register WARj coincides with that of the read address register RARj. Accordingly, the address A6 in the address chain of the outgoing highway "j" becomes an ending point.

As described, the addresses formed like a chain is referred to as an address chain.

As is clear from the foregoing, the address chain of each outgoing highway is arranged such that its starting point is designated by its RAR and its ending point is designated by its WAR, and each time a cell is read from the buffer memory, the next address can be read. When the contents of the WAR and RAR coincide, this means that there is no cell at this outgoing highway. Mismatch (non-coincidence) detection circuits 561 to 568 are provided for the corresponding outgoing highways. When the values of a couple of WAR and RAR for a certain outgoing highway are coincident, that is to say, when there is no cell at the outgoing highway, "0" is output. When the values of the WAR and RAR are not coincident, that is to say, when there is a cell at the outgoing highway, "1" is output. The value of the relevant mismatch detection circuit is selected by a selector 58' according to the outgoing highway number indicated by the input ROP, output from the output terminal RE and sent to the input terminal RE of the buffer memory, and control is exercised on judgment as to whether to read the cell from the buffer memory or not. At this time, the value of the mismatch detection circuit is also given to the decoder 54' for control. If the output of the selector 58' is "0", a read operation is not performed, so that the decoder 54' does not allow the relevant register RAR to rewrite the address.

Figure 7:
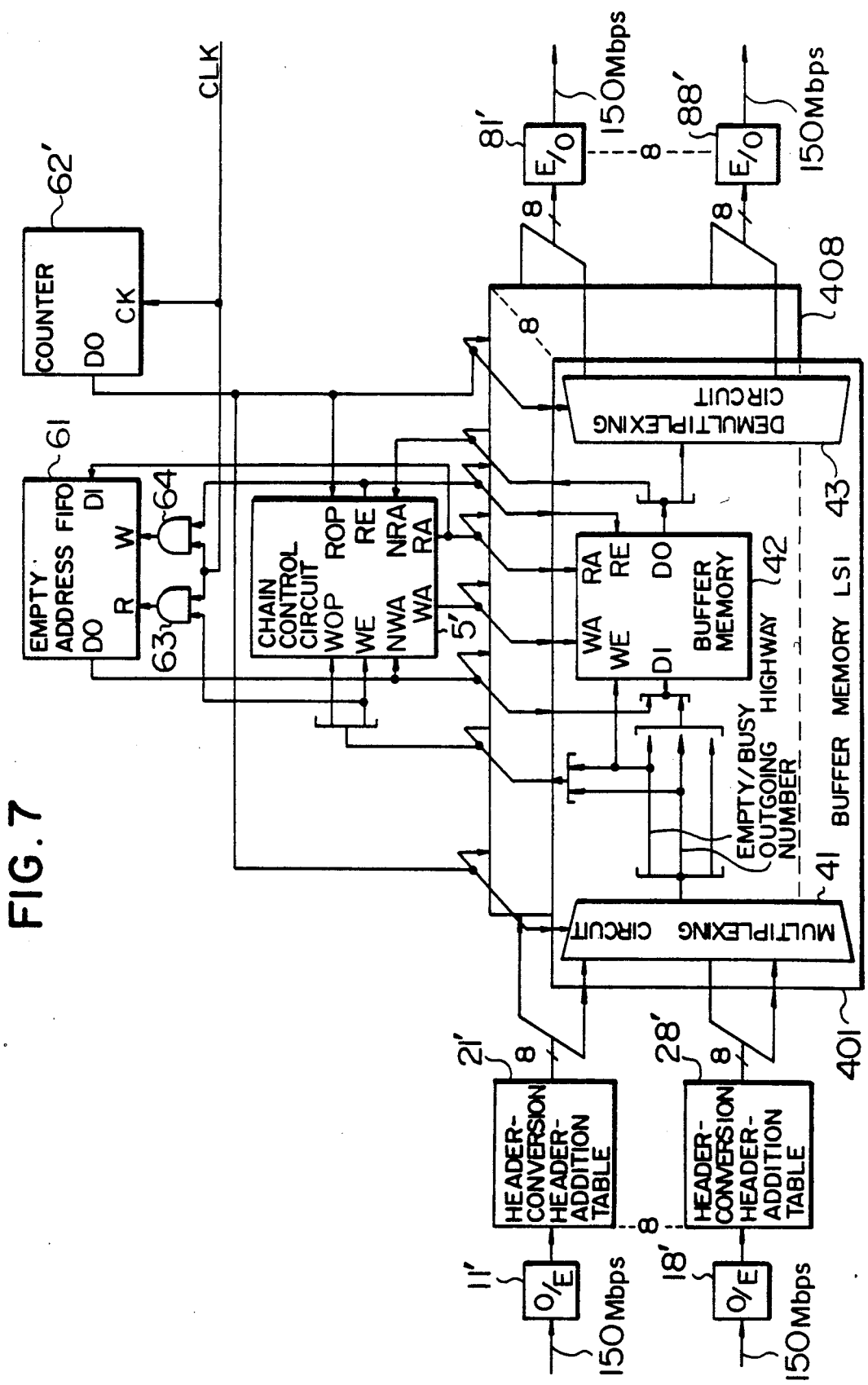
FIG. 7 is a diagram showing an example of construction of the switch of FIG. 2 in which the LSI is divided into component slices.

FIG. 7 is a block diagram showing a case in which the multiplexing circuit 41, the buffer memory 42 and the demultiplexing circuit 43 of FIG. 2 are integrated in an LSI device including memory LSIs 401 to 408. The buffer memory 42 is the place for storing the cells going to the respective outgoing highways, and when the cells concentrate at one outgoing highway from a plurality of incoming highways, very many cells are accumulated in the buffer memory. So, the buffer memory should preferably have a capacity as large as possible. Therefore, the characteristics of the switching system can be improved by enlarging the memory capacity and reducing the size of hardware by forming this section by a plurality of LSIs. In forming a combination of the buffer memory 42 with the multiplexing circuit 41 and the demultiplexing circuit 43 as shown in FIG. 2, if 8-bit parallel output is adopted for input data from the header-conversion header-addition tables 21' to 28' and for output data to the E/O converters 81' to 88' and if the buffer memory is divided into component LSI slices which correspond with the number of bits of a cell input and output in parallel. Then, the signal lines between the buffer memory LSIs can be minimized.

In FIG. 7, if the chain control circuit 5', counter 62', AND gates 63, 64, and the empty address FIFO 61 are formed by another LSI or a plurality of LSIs, the signal lines are an additional header line for transmitting empty/busy state data and outgoing highway numbers, a write address line, a read address line, a next address line from the empty address FIFO, a next address line from the buffer memory 42, and an outgoing highway line from the counter 62'. Therefore, it is easy to perform the bracketing process of the buffer memory LSI.

If the O/E converters 11' to 18', the header-conversion header-addition tables 21' to 28', and the E/O converters 81' to 88' are grouped for the respective incoming and outgoing highways, they can be bracketed easily.

In FIG. 7, when the bit rate of the incoming and outgoing highways of the whole switching system is 50 Mbps, the bit rate of input signals to the multiplexing circuit 41 and output signals from the demultiplexing circuit 43 is about 20 Mbps, and so the buffer memory can be manufactured by CMOS technology. However, if the bit rate of the incoming and outgoing highways is 600 Mbps, the bit rate of input signals of the multiplexing circuit 41 to the buffer memory LSI and output signals from the demultiplexing circuit 43 is 75 Mbps. The buffer memory LSI at this bit rate cannot keep pace with the operating speed of the switching system. Next, description will be made of an embodiment of this invention in which a switching system with an incoming and outgoing highway bit rate of 600 Mbps is realized by making partial circuit alterations and additions to a switching system of the conventional construction as shown in FIG. 2 or 7.

Figure 8:
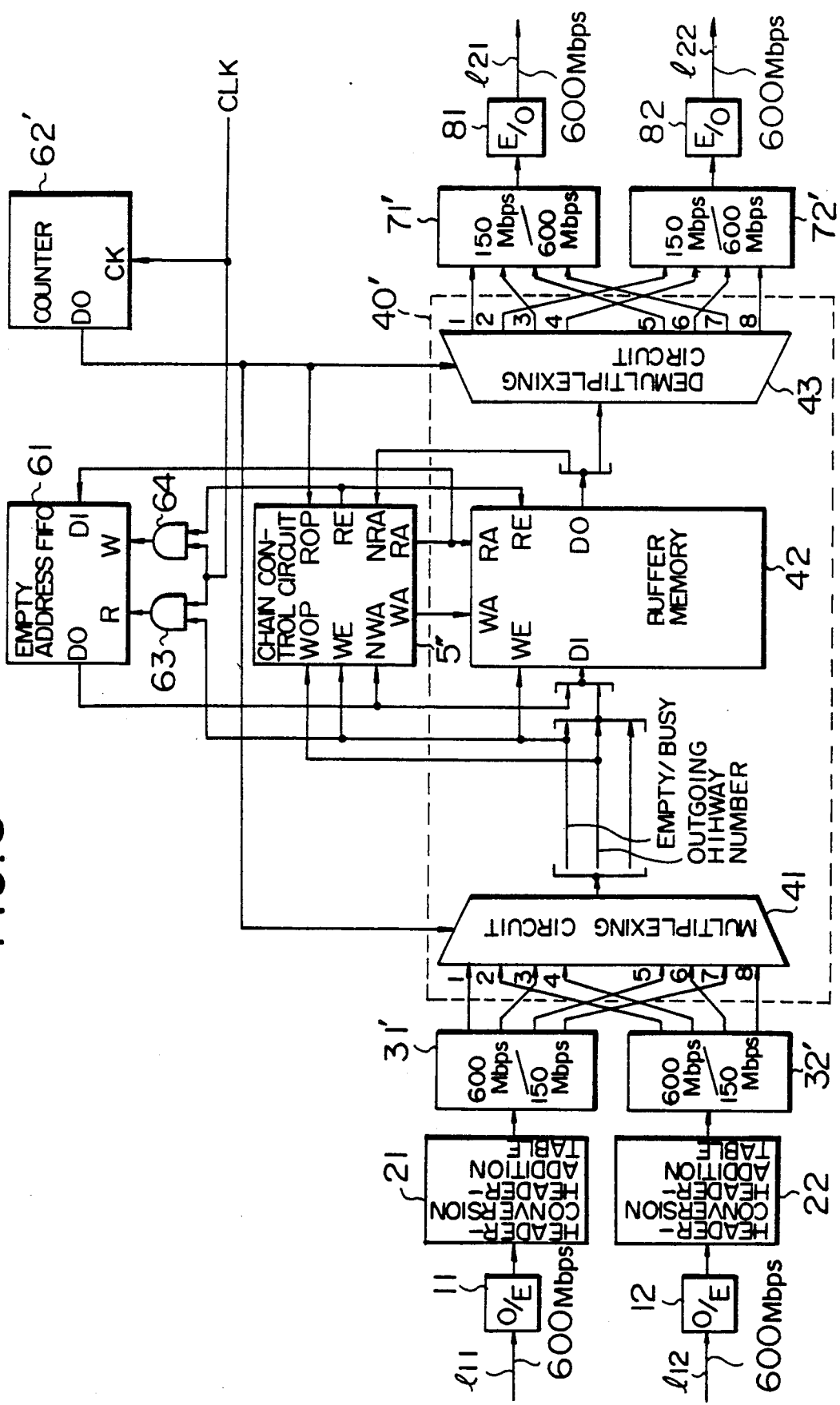
FIG. 8 is a diagram showing an embodiment of a two-input two-output switching system with the input/output link speed of 600 Mbps according to this invention.

FIG. 8 shows an embodiment of a switching system according to this invention. Shown in FIG. 2 is an eight-input eight-output switching system with an input/output link speed of 150 Mbps, and its throughput is 1.2 Gbps (150 Mbps×8). In FIG. 8, the switching system according to this invention is a two-input two-output system with an input/output link speed of 600 Mbps and with the same throughput as the system of FIG. 2. In contrast to the system of FIG. 2, the system of FIG. 8 has O/E converters 11, 12, header-conversion header-addition tables 21, 22, and E/O converters 81, 82 with their signal processing capacity improved to 600 Mbps, further comprising 600 Mbps/150 Mbps converters 31', 32', and 150 Mbps/600 Mbps converters 71', 72'. In addition, the chain control circuit 5" has been adapted to two-input two-output operation.

Figure 9A:
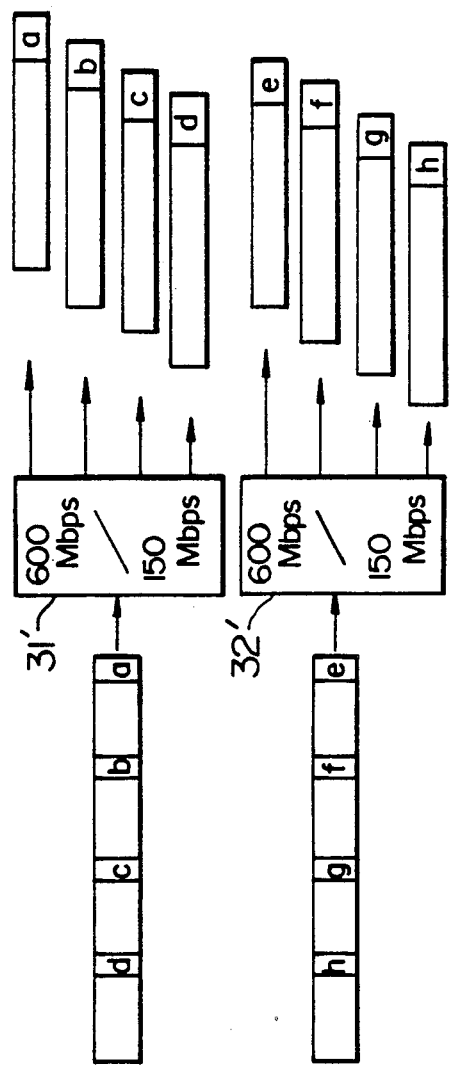
FIGS. 9A and 9B are drawings for explaining the operation of the 600 Mbps/150 Mbps converter of FIG. 8.
Figure 9B:
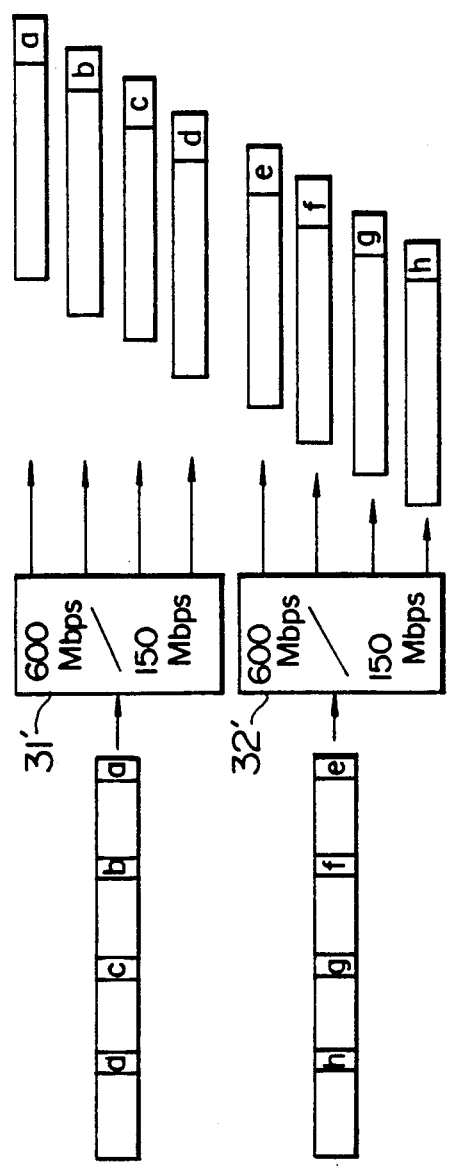
Figure 10A:
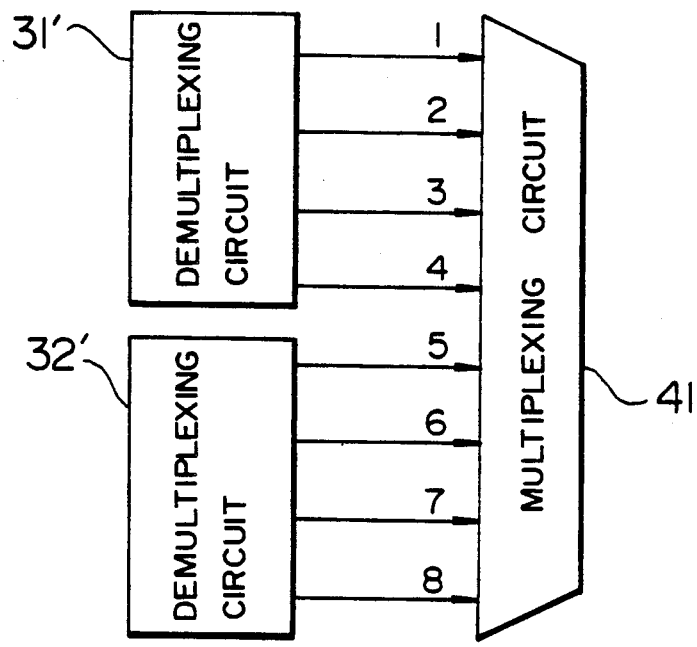
FIGS. 10A and 10B are diagram showing modifications of the interconnection among the multiplexing circuit, demultiplexing circuit and converter of FIG. 8.
Figure 10B:
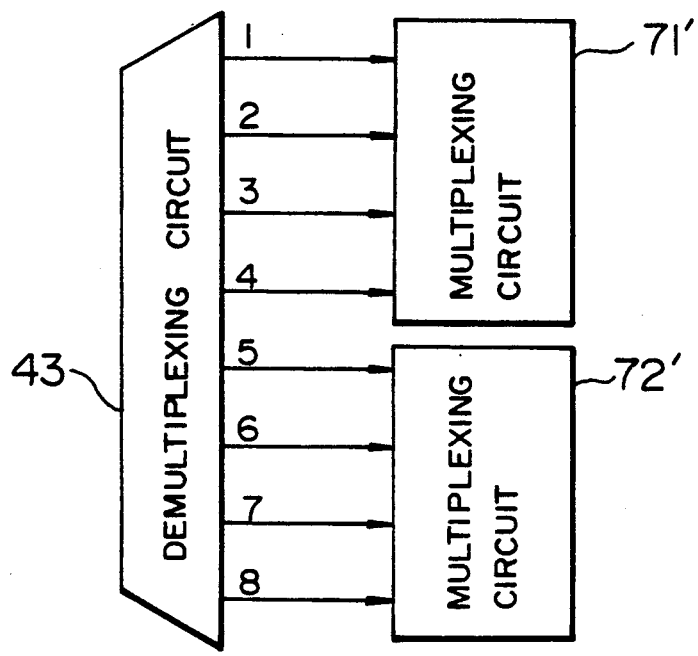
Figure 11:
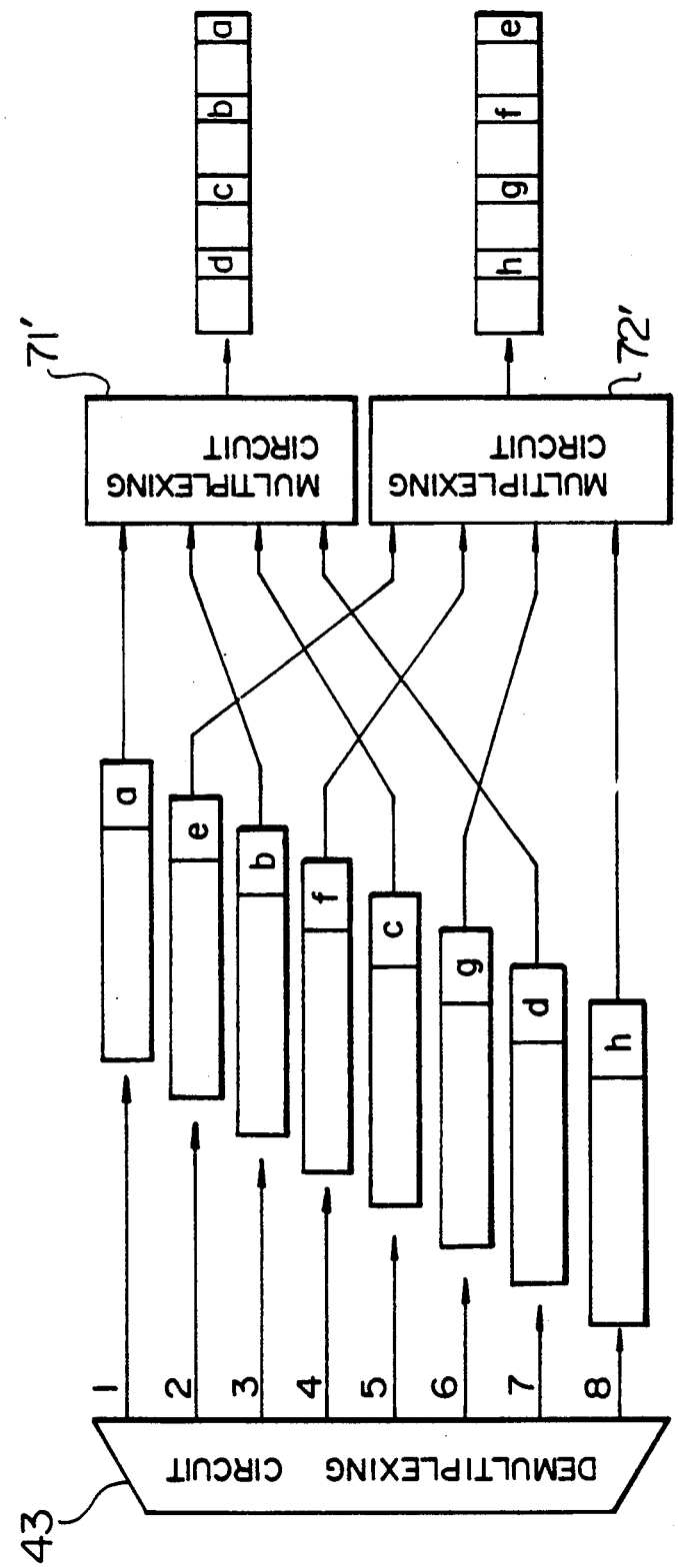
FIG. 11 is a diagram for explaining the operation of the demultiplexing circuit of FIG. 8.

With reference to FIGS. 9A and 9B, the operation of the 600 Mbps/150 Mbps converters 31', 32' will be described. The 600 Mbps/150 Mbps converters 31', 32' each divide cells arriving at 600 Mbps one after another into groups of 150 Mbps each and sequentially distribute at four outputs as shown in FIG. 9A. When the cells are output from each converter, the cells are shifted in timing by one-fourth of the cell length with respect to one another. This output timing is achieved if a cell is output immediately when one cell gets into the 600 Mbps/150 Mbps converters 31', 32'. If with respect to the 600 Mbps/150 Mbps converter 31', the cell output timing of the converter 32 is shifted by one-eighth of the cell length and the four outputs from the 600 Mbps/150 Mbps converter 31' are connected to the input terminals 1, 3, 5, 7 of the multiplexing circuit 41 and the four outputs from the 600 Mbps/150 Mbps converter 32' are connected to the input terminals 2, 4, 6, 8 of the multiplexing circuit 41, then the cells are input to the input terminals 1 to 8 of the multiplexing circuit 41 at the timing as shown in FIG. 4. Since cells are output in the order of their arrival at the 600 Mbps/150 Mbps converters 31', 32' and the multiplexing circuit 41, the cells are stored in the buffer memory 42 in the order of arrival at the incoming highways 111, 112. The cells read sequentially from the buffer memory 42 are distributed by the demultiplexing circuit 43. The cells from the output terminals 1, 3, 5, 7 are transferred to the 150 Mbps/600 Mbps converter 71', while the cells from the output terminals 2, 4, 6, 8 are transferred to the 150 Mbps/600 Mbps converter 72'. The output timing of cells from the demultiplexing circuit 43 and the input timing of cells to the 150 Mbps/600 Mbps converters 71', 72' are as shown in FIG. 11. The operation of the 150 Mbps/600 Mbps converters 71', 72' is the opposite of the 600 Mbps/150 Mbps converters 31', 32'. The cells which arrive at the timing of FIG. 11 are output at the timing as shown, and four inputs of 150 Mbps each are converted into one output of 600 Mbps. The demultiplexing circuit 43 and the 150 mbps/600 Mbps converters 71', 72' output the cells in the order of input, and the cells are output through the outgoing highways 121, 122 while maintaining the order of output from the buffer memory 42. As shown in FIG. 9B, the output timing of the cells from the converter 31' may be shifted by one-eighth of the cell length with respect to one another, and the output timing of the cells from the converter 32' may be shifted by one-half of the cell length. In this case, the four outputs from each converter 31', 32' are input to the multiplexing circuit 41 as shown in FIG. 10A. The outputs from the demultiplexing circuit 43 are connected with the converters 71', 72' as shown in FIG. 10B.

Referring to FIG. 8, when the counter 62' outputs 1, 3, 5 or 7, the chain control circuit 5" outputs a read address to read a cell which goes to the outgoing highway 121. When the counter 62' outputs 2, 4, 6 or 8, the chain control circuit 5" outputs a read address to read a cell which goes to the outgoing highway 122. In this way, the cells which go to the outgoing highway 21 are output at the output terminals 1, 3, 5, 7 and the cells which go to the outgoing highway 122 are output at the output terminals 2, 4, 6, 8 of the demultiplexing circuit 43.

Figure 12:
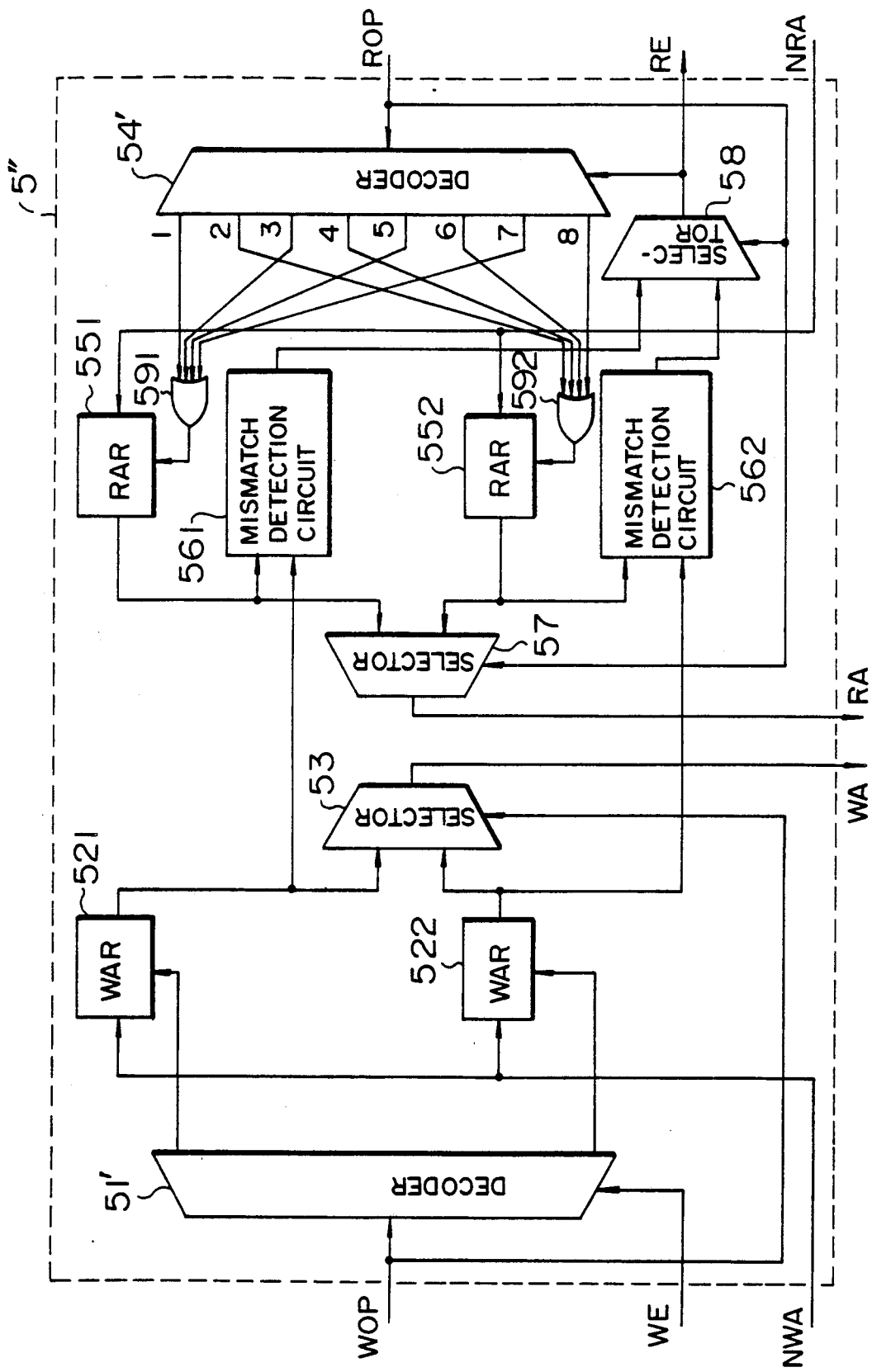
FIG. 12 is a diagram showing an example of the chain control circuit in the case of the switching system of FIG. 8.

FIG. 12 shows an example of the construction of the chain control circuit 5" of FIG. 8. The write address register (WAR) 521, the read address register (RAR) 551, and the mismatch (non-coincidence) detection circuit 561 are provided for the outgoing highway (21 to perform address chain control of the cells at the outgoing highway (21. On the other hand, the write address register (WAR) 522, the read address register (RAR) 552, and the mismatch detection circuit 562 are provided for the outgoing highway 122 to perform address chain control of the cells at this outgoing highway.

The decoder 51', the WARs 521, 522, and the selector 53 perform the same operations at those of FIG. 5.

The read address register (RAR) 551 is made rewritable by the decoder 54' and the OR gate 591 when the count of the counter 62' input through the input terminal ROP is 1, 3, 5 or 7. The read address register (RAR) 552 is made rewritable by the decoder 54' and the OR gate 592 when the count of the counter input through the input terminal ROP is 2, 4, 6 or 8. A register RAR made rewritable outputs the address before rewritten to the terminal RA through the selector 57, and simultaneously gets the next address from the buffer memory, which has been input at the input NRA.

In the embodiment of FIG. 8, the buffer memory LSIs 401 to 408 shown in FIG. 7 can be used without changing their performance. In addition, the empty address FIFO 61, the counter 62', and the AND gates 63, 64 of FIG. 7 can be used with no changes. The chain control circuit 5' of FIG. 7 can be used with minor changes made to it.

According to this invention, a switching system by the method of sharing a buffer memory of an input/output link speed of, e.g., 150 Mbps among the outgoing highways can be converted into a switching system with 600 Mbps input/output links by connecting a 600 Mbps/150 Mbps converter to an input link and a 150 Mbps/600 Mbps converter to an output link, and thereby controlling the addresses of the buffer memory so as to comply with the outgoing highways of 600 Mbps.

In order to form the above arrangement, in a switching system with an input/output link speed of 150 Mbps, it is possible to use with no change the buffer memory, the multiplexing circuit for multiplexing the input links and storing the cells in the buffer memory one after another, and the demultiplexing circuit for distributing the cells from the buffer memory to the output links. It is only necessary to make additions and alterations to the other parts to make a switching system with input links of 600 Mbps.

If the buffer memory, the multiplexing circuit, and the demultiplexing circuit are formed in an LSI board, this board can be used with no change for a 600 Mbps input link switching system. Therefore, those which need to be developed anew can be minimized.

In the above embodiment, cases of construction has been described in which the buffer memory with an input/output link speed of 150 Mbps is applied to the switching system with an input/output link speed of 600 Mbps. However, this invention is not limited to this input/output link speed, but can be applied to other input/output link speeds.

This embodiment uses two each of incoming and outgoing highways. Needless to say, this invention can be applied to cases of three or more each of incoming and outgoing highways.

In the above embodiments, the bit rate v of the cells input into the buffer memory is the same as the bit rate $v'$ of the cells output therefrom ($v=v'$). However, the relation between the bits rates may be $v<v'$. In this case, the count timing of the counters 62, 62' is made faster than the timing of cell input into the buffer memory.

In the above embodiments, when ratio of the bit rates of cells input into and output from the converters 31, 32 (31', 32') is 1 to n, the ratio of the bit rates of cells input into and output from the converters 71, 72 (71', 72') is n to 1, but this bit rate may be m to 1 ($n \neq m$, where n and m are integers). In this invention, the buffer memory is used in a method of its being shared logically among the incoming and outgoing highways, but may be applied to the system of the literature (1) and JP-A-59-135994.

For the chain control circuit, either of the chain control circuits described in U.S. Ser. Nos. 382,419 and 482,090 may be used.

The converters 31, 32 (31', 32') may be formed in a single circuit. The converters 71, 72 (71', 72') may be likewise formed in a single circuit.

We claim:

1. A switching system for switching communication information between "M", where "M" is an integer, incoming highways and "N", where "N" is an integer, outgoing highways by using fixed-length cells, each cell having a header section and a data section, switching of each cell being performed according to information contained in said head section, comprising:

a demultiplexing unit for demultiplexing each incoming highway into a plurality of first output links;

a switch unit, having the first output links of said demultiplexing unit as first input links and a plurality of second output links, for switching communication information between said first input links and said second output links; and a multiplexing unit, having "N" groups of second input links, each group being formed by grouping a specified number of second output links of said switch unit as said "N" groups of second input links, and "N" third output links, for multiplexing the cells on the second input links of each group and outputting each cell through one of said third output links to one corresponding outgoing highway;

wherein said demultiplexing means includes means for outputting the cells input from the incoming highways by sequentially distributing said cells to said plurality of first output links in the order of arrival, wherein said first memory means includes means for outputting, in the order of input, the cells to said specified number of second input links of each of "N" groups of second input links of said multiplexing means, and wherein said multiplexing means includes means for outputting, in the order of input, the cells input into said specified number of second input links to corresponding third output links.

2. A switching system for processing a plurality of cells, each cell including a header section and a data section, and for switching communication information contained in the data section of the cell between "M", where "M" is an integer, incoming highways and "N", where "N" is an integer, outgoing highways according to the data contained in the header section of the cell, comprising:

demultiplexing means for demultiplexing each incoming highway into a plurality of first output links;

first memory means, having the first output links of said demultiplexing means as first input links, a plurality of second output links and addressable storage locations for storing the cells received through said first output links from said demultiplexing means, for switching information between said first output links and second output links according to information contained in said header section;

multiplexing means, having "N" groups of second input links, each group being formed by grouping a specified number of said second output links of said first memory means, and "N" third output links, for outputting the cells on said second input links through one of said third output links to one corresponding outgoing highway; and means for controlling write operations of said first memory means in accordance with an address identifying an empty storage location of said first memory means;

wherein said demultiplexing means includes means for outputting the cells input from the incoming highways by sequentially distributing said cells to said plurality of first output links in the order of arrival, wherein said first memory means includes means for outputting, in the order of input, the cells to said specified number of second input links of each of "N" groups of second input links of said multiplexing means, and wherein said multiplexing means includes means for outputting, in the order of input, the cells input into said specified number of second input links to corresponding third output links.

3. A switching system for processing a plurality of cells, each cell including a header section and a data section, and for switching communication information contained in the data section of the cell between "M", where "M" is an integer, incoming highways and "N", where "N" is an integer, outgoing highways according to the data contained in the header section of the cell, comprising:

demultiplexing means for demultiplexing each incoming highway into a plurality of first output links;

first memory means, having the first output links of said demultiplexing means as first input links, a plurality of second output links and addressable storage locations for storing the cells received through said first output links from said demultiplexing means, for switching information between said first output links and second output links according to information contained in said header section;

multiplexing means, having "N" groups of second input links, each group being formed by grouping a specified number of said second output links of said first memory means, and "N" third output links, for outputting the cells on said second input links through one of said third output links to one corresponding outgoing highway; and second memory means for storing an address identifying an empty storage location of said first memory means; and means for controlling write operations of said first memory means in accordance with said address stored in said second memory means;

wherein said demultiplexing means includes means for outputting the cells input from the incoming highways by sequentially distributing said cells to said plurality of first output links in the order of arrival, wherein said first memory means includes means for outputting, in the order of input, the cells to said specified number of second input links of each of "N" groups of second input links of said multiplexing means, and wherein said multiplexing means includes means for outputting, in the order of input, the cells input into said specified number of second input links to corresponding third output links.

4. A switching system according to claim 3, wherein said controlling means includes first means for storing in said first memory means said address from said second memory means as a next address at which data is to be stored along with a cell received from said demultiplexing means, and means for storing said address for use as a write address to store the next cell received from said demultiplexing means for a given outgoing highway in said first memory means.

5. A switching system according to claim 4, wherein said controlling means further includes second means for storing said next address read out of said first memory means at the time a cell is read out of said first memory means for a given outgoing highway, and means for reading another cell from said first memory means for said given outgoing highway using said next address stored in said second means.

6. A switching system according to claim 5, wherein said controlling means also includes means for storing said next address in said second means into said second memory means when that address is used to read said another cell from said first memory means.

7. A switching system for switching communication information between "M" where "M" is an integer, incoming highways for transmitting cells at a bit rate of m×v, where "m" is an integer and "v" is a positive integer and "N", where "N" is an integer, outgoing highways for transmitting the cells at a bit rate of n×v', where "n" is an integer and "v'" is a positive integer, by using fixed-length cells, each cell having a header section and a data section, said cells are input from each incoming highway and each cell is switched according to information contained in said header section, comprising:

"M" demultiplexing units, provided to correspond with said "M" incoming highways, each demultiplexing unit has "m" first output links, each demultiplexing unit, on receiving "m" cells at a bit rate of m×v from a corresponding incoming highway, demultiplexing the cells into the "m" first output links and outputs the cells one after another at a bit rate of b to each first output link;

a switching unit, having "M" groups of "m" first output links of said "M" demultiplexing units as "M" groups of "m" first input links with a bit rate of v and "N" groups of "n" second output links with a bit rate of v, for switching communication information between said first input links and said second output links according to information contained in said header section of each cell; and "N" multiplexing units, provided to correspond with "N" outgoing highways, each multiplexing unit has a third output link, each multiplexing unit being capable of receiving cells from "n" corresponding second output links of said switch unit, multiplexing "n" cells supplied at a bit rate of v on said "n" second output links, and outputting the cells at a bit rate of n×v to third output links to output the cells to the corresponding outgoing highways;

each demultiplexing unit includes means for outputting the cells from the incoming highway thereof by sequentially distributing said cells to said "m" first output links in the order of arrival, wherein said switch unit includes means for outputting the cells to said "n" second output links in the order of the cells being input into said switch unit; and each multiplexing unit includes means for outputting the cells received from said "n" second output links to one corresponding third output link in the order of input.

8. A switching system according to claim 7, wherein said switching unit includes means for multiplexing cells on said "M" groups of "m" first input links in time division, first memory means having addressable storage locations for storing cells received from said demultiplexing units means for demultiplexing and distributing data output from said first memory means among said "N" groups of "n" second output links, second memory means for storing an address identifying an empty storage location of the first memory means, and means for controlling the write operations of said first memory means in accordance with said address stored in the second memory means.

9. A switching system according to claim 8, wherein said controlling means includes first means for storing in said first memory means said address from said second memory means as next address at which data is to be stored along with a cell received from said multiplexing means, and means for storing said address for use as a write address to store the next cell received from said multiplexing means for a given outgoing highway in said first memory means.

10. A switching system according to claim 9, wherein said controlling means further includes second means for storing said next address read out of said first memory means at the time a cell is read out of said first memory means for a given outgoing highway, and means for reading another cell from said first memory means for said given outgoing highway using said next address stored in said second means.

11. A switching system according to claim 10, wherein said controlling means also includes means for storing said next address in said second means into said second memory means when that address is used to read said another cell from said first memory means.

12. A switching system according to claim 8, wherein said multiplexing means and said second memory means of said switching unit, and said demultiplexing means are formed on an LSI board.

13. A switching system according to claim 10, wherein said second means of said controlling means of said switching unit, and said multiplexing means, said second memory means, and said demultiplexing means of said switching unit are formed on an LSI board.

14. A switching system according to claim 12, wherein said LSI board is divided into components which correspond to the number of bits of a cell input in parallel to the switching unit.

15. A switching system according to claim 7, wherein each cell input from said incoming highway has a logical channel number in the header section, and wherein each demultiplexing unit includes outgoing highway number adding means for deciding an outgoing highway number for a given cell according to the logical channel number of the cell input and adding that outgoing highway number to the cell as a header for the switching unit used in the switching system, and logical channel number converting means for converting said logical channel number to a new logical channel number which the cell uses at the outgoing highway.

* * * * *